United States Patent
Izumi et al.

(10) Patent No.: US 11,781,633 B2
(45) Date of Patent: Oct. 10, 2023

(54) RACK BAR AND STEERING APPARATUS

(71) Applicant: JTEKT CORPORATION, Osaka (JP)

(72) Inventors: Yoshiaki Izumi, Okazaki (JP); Hirofumi Ishimi, Katsuragi (JP); Isao Torii, Kashiwara (JP)

(73) Assignee: JTEKT CORPORATION, Kariya (JP)

(*) Notice: Subject to any disclaimer, the term of this patent is extended or adjusted under 35 U.S.C. 154(b) by 299 days.

(21) Appl. No.: 16/833,907

(22) Filed: Mar. 30, 2020

(65) Prior Publication Data
US 2020/0318722 A1 Oct. 8, 2020

(30) Foreign Application Priority Data
Apr. 2, 2019 (JP) .................. 2019-070882

(51) Int. Cl.
| F16H 55/26 | (2006.01) |
| F16H 55/06 | (2006.01) |
| H05B 6/02 | (2006.01) |
| B62D 3/12 | (2006.01) |
| F16H 55/32 | (2006.01) |

(52) U.S. Cl.
CPC ............ *F16H 55/06* (2013.01); *H05B 6/02* (2013.01); *B62D 3/126* (2013.01); *F16H 2055/325* (2013.01)

(58) Field of Classification Search
CPC ..... F16H 55/06; F16H 2055/325; H05B 6/02; B62D 3/126
See application file for complete search history.

(56) References Cited

U.S. PATENT DOCUMENTS

| 5,473,960 A | 12/1995 | Sakamoto et al. |
| 8,348,289 B2 * | 1/2013 | Tanaka .................. F16H 55/283 |
| | | 280/93.514 |

FOREIGN PATENT DOCUMENTS

| CN | 105296719 A | * | 2/2016 |
| JP | S57-193446 U | | 12/1982 |
| JP | 62178471 A | * | 8/1987 |
| JP | S62-178471 A | | 8/1987 |
| JP | H06-264992 A | | 9/1994 |
| JP | H11-270657 A | | 10/1999 |
| JP | 2014133929 A | * | 7/2014 |
| JP | 2017-057442 A | | 3/2017 |

OTHER PUBLICATIONS

Human translation of JP62178471A. (Gokan H) (Year: 1987).*
Machine translation of JP2014133929A (Miyazaki C) (Year: 2014).*
Machine translation of CN 105296719 to Miyazaki (Year: 2016).*
Aug. 31, 2020 Extended Search Report issued in European Patent Application No. 20167067.6.
Feb. 7, 2023 Office Action issued in Japanese Patent Application No. JP 2019-070882.

* cited by examiner

*Primary Examiner* — Randell J Krug
(74) *Attorney, Agent, or Firm* — Oliff PLC

(57) ABSTRACT

A rack bar includes: a rack tooth row including a plurality of rack teeth meshing with pinion teeth; a hardened layer provided continuously over an entire circumference of the rack tooth row; and a center portion provided inside the hardened layer and having lower hardness than the hardened layer. When the rack bar is viewed in an axial direction of the rack bar, a depth of the hardened layer from the following positions i), ii), and iii) increases in this order: i) a bottom land of the rack teeth; ii) a side of the rack bar relative to the bottom land; and iii) a back of the rack bar relative to the bottom land.

2 Claims, 5 Drawing Sheets

RACK BAR AND STEERING APPARATUS

CROSS-REFERENCE TO RELATED APPLICATION

This application claims priority to Japanese Patent Application No. 2019-070882 filed on Apr. 2, 2019, incorporated herein by reference in its entirety.

BACKGROUND

1. Technical Field

The disclosure relates to a rack bar and a steering apparatus.

2. Description of Related Art

A rack and pinion steering apparatus for vehicles is used to translate a rotary motion of a steering shaft into an axial linear motion of a rack bar connected to turning wheels for transmission of a steering force of a steering wheel to the turning wheels. In a rack and pinion mechanism, a pinion shaft is supported by ball bearings, needle bearings, or the like. The rack bar is supported by a meshing portion between rack teeth on the rack bar and pinion teeth on the pinion shaft and rack bushes. There are various specifications regarding meshing between the rack teeth and the pinion teeth, and the tooth specifications are modified according to required specifications (e.g., specific stroke and rack stroke) of a vehicle.

In the rack and pinion steering apparatus, the meshing portion between the rack teeth and the pinion teeth receives loads due to positive input torque applied from the steering wheel and due to a reverse input load applied from tires. The reverse input load applied from the tires tends to increase as the meshing portion between the rack teeth and the pinion teeth nears either end of a rack stroke (either end of a rack tooth row) by the influences of frictional force of the tires, suspension geometry, and other factors.

Also, when the meshing portion between the rack teeth and the pinion teeth reaches either end of the rack tooth row due to a driver turning the steering wheel sharply for garaging the vehicle or other reasons, so-called end-abutting occurs, where the rack bar abuts on a stopper and stops. An impact load of this end-abutting is applied to the meshing portion between the rack teeth and the pinion teeth. This impact load becomes even greater when the rack and pinion steering apparatus is one having an assist mechanism. This necessitates ensuring required strength (in particular, axial strength) of the rack teeth of the rack bar.

Also, when any turning wheel of the vehicle accidentally hits a hole during traveling, a heavy impact load is applied to the rack bar. This necessitates ensuring required strength (in particular, bending strength) of the rack bar. Japanese Patent Application Publication Nos. 6-264992 and 2017-057442 each disclose a rack bar having a hardened layer (mainly composed of a martensite structure) formed continuously over an entire circumference of a rack tooth row including multiple rack teeth. The hardened layer helps ensure required strength (in particular, axial strength) of the rack teeth of the rack bar and required strength (in particular, bending strength) of the rack bar.

SUMMARY

However, it has been found that forming a hardened layer (mainly composed of a martensite structure) deeply in the rack bar may embrittle the rack bar because forming such a deep hardened layer decreases a center portion of the rack bar formed inside the hardened layer and having toughness and lower hardness than the hardened layer.

The disclosure helps increase axial strength and bending strength and reduce embrittlement.

A first aspect of the disclosure relates to a rack bar. The rack bar includes: a rack tooth row including a plurality of rack teeth meshing with pinion teeth; a hardened layer provided continuously over an entire circumference of the rack tooth row; and a center portion provided inside the hardened layer and having lower hardness than the hardened layer. When the rack bar is viewed in an axial direction of the rack bar, a depth of the hardened layer from a following positions i), ii), and iii) increases in this order: i) a bottom land of the rack teeth; ii) a side of the rack bar relative to the bottom land; and iii) a back of the rack bar relative to the bottom land.

With the above aspect, the hardened layer is formed continuously over the entire circumference of the rack tooth row of the rack bar. This increases axial strength of the rack teeth and the bending strength of the rack bar. Further, the hardened layer is formed such that its depth from the bottom land of the rack teeth, from the side of the rack bar, and from the back of the rack bar increases in this order. This reduces a decrease of the center portion formed inside the hardened layer and having lower hardness than the hardened layer, helping reduce embrittlement of the rack bar.

A second aspect of the disclosure relates to a steering apparatus. The steering apparatus includes: a housing; a rack bar supported by the housing so as to move in an axial direction and coupled to wheels of a vehicle; and a pinion shaft supported by the housing so as to rotate around an axis of the pinion shaft. The pinion shaft meshes with a rack tooth row of the rack bar and is coupled to a steering wheel of the vehicle. The rack bar includes: the rack tooth row including a plurality of rack teeth meshing with pinion teeth; a hardened layer provided continuously over an entire circumference of the rack tooth row; and a center portion provided inside the hardened layer and having lower hardness than the hardened layer. When the rack bar is viewed in the axial direction of the rack bar, a depth of the hardened layer from a following positions i), ii), and iii) increases in this order: i) a bottom land of the rack teeth; ii) a side of the rack bar relative to the bottom land; and iii) a back of the rack bar relative to the bottom land.

With the above aspect, the hardened layer is formed continuously over the entire circumference of the rack tooth row of the rack bar. This increases axial strength of the rack teeth and the bending strength of the rack bar. Further, the hardened layer is formed such that its depth from the bottom land of the rack teeth, from the side of the rack bar, and from the back of the rack bar increases in this order. This reduces a decrease of the center portion formed inside the hardened layer and having lower hardness than the hardened layer, helping reduce embrittlement of the rack bar.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A description will be given of a schematic configuration of a steering apparatus including a rack bar of an embodiment of the disclosure. The steering apparatus may be a rack and pinion electric power steering apparatus having a column assist mechanism where an electric motor delivers power to a column shaft or a rack and pinion electric power steering apparatus having a pinion assist mechanism where an electric motor delivers power to a pinion shaft.

The steering apparatus may also be a rack and pinion electric power steering apparatus having a rack assist mechanism where an electric motor delivers power to a rack bar or a rack and pinion steering apparatus having no assist mechanism. The steering apparatus at least includes a steering mechanism, a turning mechanism, and an assist mechanism.

Figure 1:
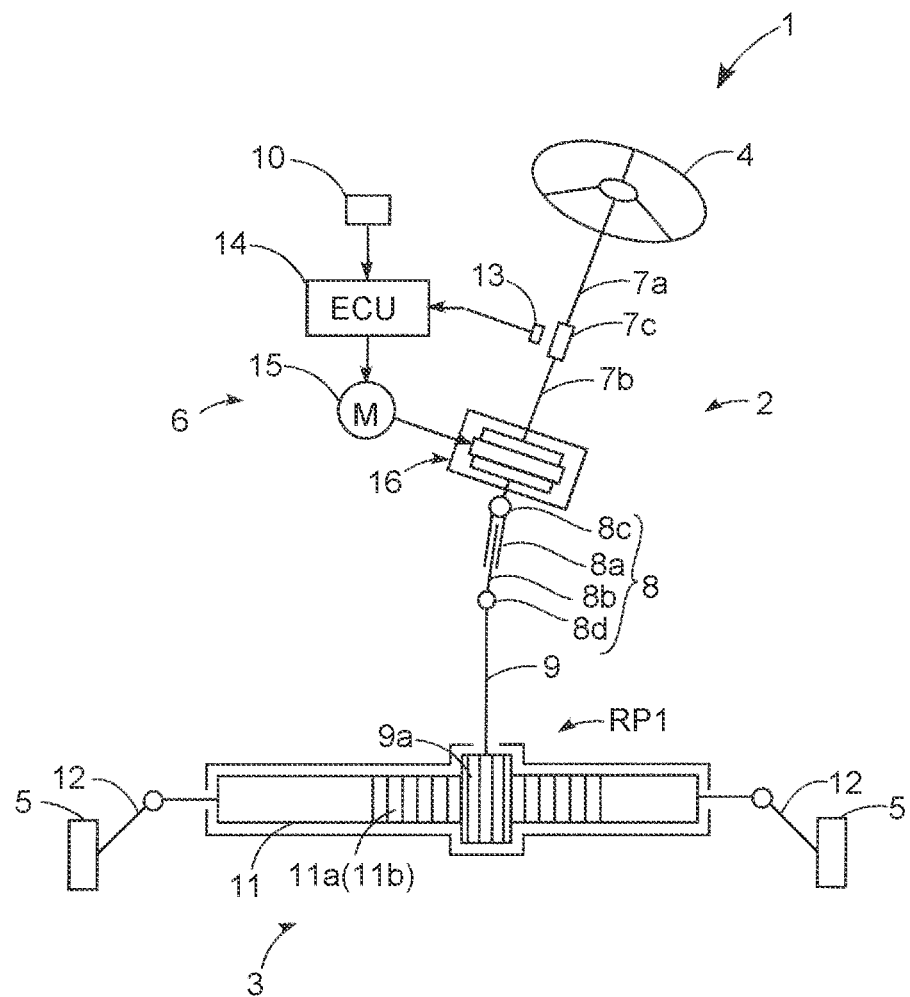
FIG. 1 shows a schematic configuration of a steering apparatus of an embodiment of the disclosure.

By way of example, the steering apparatus described below is a rack and pinion electric power steering apparatus having a column assist mechanism. Accordingly, as shown in FIG. 1, the steering apparatus 1 includes a steering mechanism 2 and a turning mechanism 3 and turns turning wheels 5 according to a driver's operation of a steering wheel 4 (steering member). The steering mechanism 2 includes an assist mechanism 6 assisting the driver's steering operation.

The steering mechanism 2 includes an input shaft 7a, an output shaft 7b, an intermediate shaft 8, and a pinion shaft 9 constituting a rack and pinion mechanism PR1. The input shaft 7a is coupled to the steering wheel 4. The output shaft 7b is coupled to the input shaft 7a via a torsion bar 7c. The intermediate shaft 8 is coupled to the pinion shaft 9 via a second universal joint 8d.

The intermediate shaft 8 is configured to extend and contract in an axial direction of the intermediate shaft 8 and includes a first shaft 8a and a second shaft 8b that are, for example, mated with each other by spline fitting so as to move relative to each other and rotate together. The first shaft 8a is coupled with a first universal joint 8c, and the second shaft 8b is coupled with the second universal joint 8d. The pinion shaft 9 is formed with pinion teeth 9a.

The turning mechanism 3 includes a rack bar 11 constituting the rack and pinion mechanism PR1 and tie rods 12.

The rack bar 11 is formed with rack teeth 111 (see FIG. 2A) meshing with the pinion teeth 9a. Each tie rod 12 is coupled at its one end to the rack bar 11 and coupled at its other end to the corresponding turning wheel 5. In response to rotation of the steering wheel 4 by the driver's operation, the pinion shaft 9 rotates via the input shaft 7a, the output shaft 7b, and the intermediate shaft 8.

Rotation of the pinion shaft 9 is translated into axial reciprocal motion of the rack bar 11. This axial reciprocal motion of the rack bar 11 is transmitted to the turning wheels 5 via the respective tie rods 12. This changes turning angles of the turning wheels 5, whereby a traveling direction of a vehicle is changed.

The assist mechanism 6 includes a torque sensor 13, an electronic control unit (ECU) 14, an electric motor 15, and a worm reducer 16. The torque sensor 13 detects a torsion amount between the input shaft 7a and the output shaft 7b. The ECU 14 determines assist torque based on steering torque obtained from the torsion amount detected by the torque sensor 13 and based on a vehicle speed detected by a vehicle speed sensor 10.

The electric motor 15 is driven and controlled by the ECU 14. The worm reducer 16 transmits rotational force of the electric motor 15 to the output shaft 7b. As a result, assist torque is applied to the output shaft 7b, assisting the driver's steering operation.

The rack bar 11 of the present embodiment may be a rack bar with a constant gear ratio or a rack bar with a variable gear ratio where rack tooth specifications are varied according to axial positions on the rack bar. By way of example, the rack bar as discussed herein is a rack bar with a constant gear ratio.

Figure 2A:
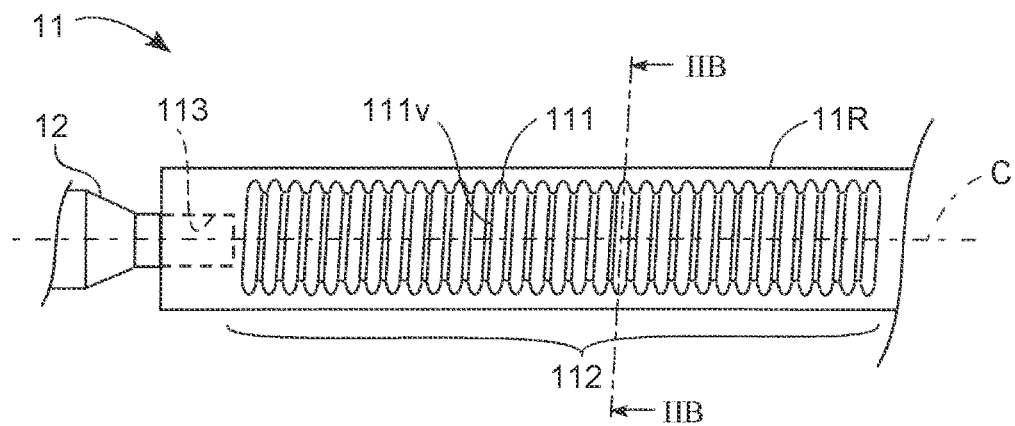
FIG. 2A shows a rack bar of the embodiment of the disclosure as viewed in a direction perpendicular to its axis.

As shown in FIG. 2A, the rack bar 11 of the present embodiment is formed on its outer surface with a rack tooth row 112 including multiple rack teeth 111, and the rack bar 11 is also formed on its each end face with a female thread 113 coupled with the corresponding tie rod 12. The rack tooth row 112 is formed by pressing with a die and thereby plastically deforming a solid shaft member 11R made of pre-heat treated (quenched and tempered) steel or is formed by cutting the shaft member 11R. The shaft member 11R may be hollow except at its portion formed with the rack tooth row 112.

Figure 2B:
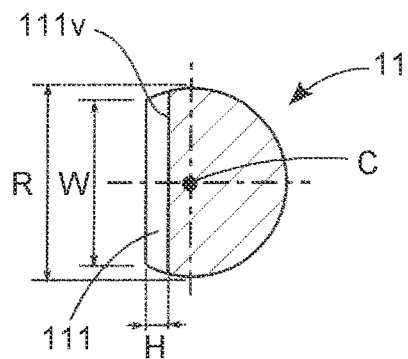
FIG. 2B is a sectional view along the line IIB-IIB of the rack bar of FIG. 2A as viewed in its axial direction.

Vehicles have recently been required to reduce in size to improve fuel efficiency for better environmental performance. To this end, weight reduction of the rack and pinion steering apparatus is essential. An effective way to achieve this is to reduce a rack diameter of the rack bar. Thus, as shown in FIG. 2B, a rack diameter R of the rack bar 11 of the present embodiment is smaller than a rack diameter Ra of a standard rack bar 21 shown in FIG. 2C that is set to meet required specifications (e.g., specific stroke and rack stroke) of vehicles. This allows for weight reduction of the rack and pinion steering apparatus.

Figure 2C:
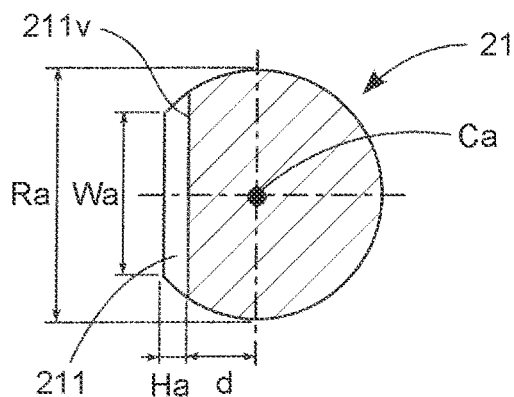
FIG. 2C is a sectional view of a conventional standard rack bar as viewed in its axial direction.
Figure 2D:
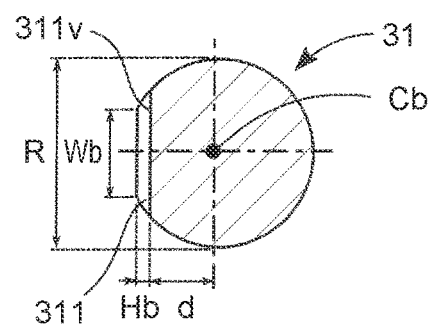
FIG. 2D is a sectional view of a provisional rack bar as viewed in its axial direction.

However, reducing the rack diameter of the rack bar involves narrowing a tooth depth and a facewidth of the rack tooth, which typically makes it difficult to ensure required strength (axial strength in particular) of the rack tooth as described in the above Summary section. Specifically, as shown in FIG. 2C, a standard rack tooth 211 of the conventional standard rack bar 21 has a facewidth Wa and a tooth depth Ha that are set based on tooth specifications complying with required specifications (e.g., specific stroke and rack stroke) of vehicles. Meanwhile, a provisional rack bar 31 shown in FIG. 2D is a smaller diameter version (having a diameter equal to the rack diameter R of the rack bar 11 of the present embodiment) of the standard rack bar 21.

A provisional rack tooth 311 of the provisional rack bar 31 is formed such that a distance d between an axis Cb of the provisional rack bar 31 and a bottom land 311v of the provisional rack tooth 311 is equal to a distance d between an axis Ca of the standard rack bar 21 and a bottom land 211v of the standard rack tooth 211. Thus, a facewidth Wb and a tooth depth Hb of the provisional rack tooth 311 of the provisional rack bar 31 are smaller than the facewidth Wa and the tooth depth Ha, respectively, of the standard rack tooth 211 of the standard rack bar 21. This means that axial strength of the provisional rack tooth 311 is smaller than that of the standard rack tooth 211.

When the facewidth and the tooth depth of the provisional rack bar 31 are made equal to the facewidth and the tooth depth, respectively, of the standard rack bar 21, the distance between the axis Cb of the provisional rack bar 31 and the bottom land 311v of the provisional rack tooth 311 becomes smaller than the distance between the axis Ca of the standard rack bar 21 and the bottom land 211v of the standard rack tooth 211. This still causes decrease in axial strength of the provisional rack tooth 311.

Thus, as shown in FIG. 2B, the rack bar 11 of the present embodiment is gear-cut deeply in the radial direction such that the position of the bottom land 111v of the rack tooth 111 is displaced closer to the axis C of the rack bar 11 than the position of the bottom land 311v of the provisional rack tooth 311. This can make a facewidth W and a tooth depth H of the rack tooth 111 larger than the facewidth Wb and the tooth depth Hb, respectively, of the provisional rack bar 31 despite the rack diameter R of the rack bar 11 being made smaller than the rack diameter Ra of the standard rack bar 21. This allows the rack tooth 111 to have axial strength similar to that of the standard rack tooth 211.

Figure 3:
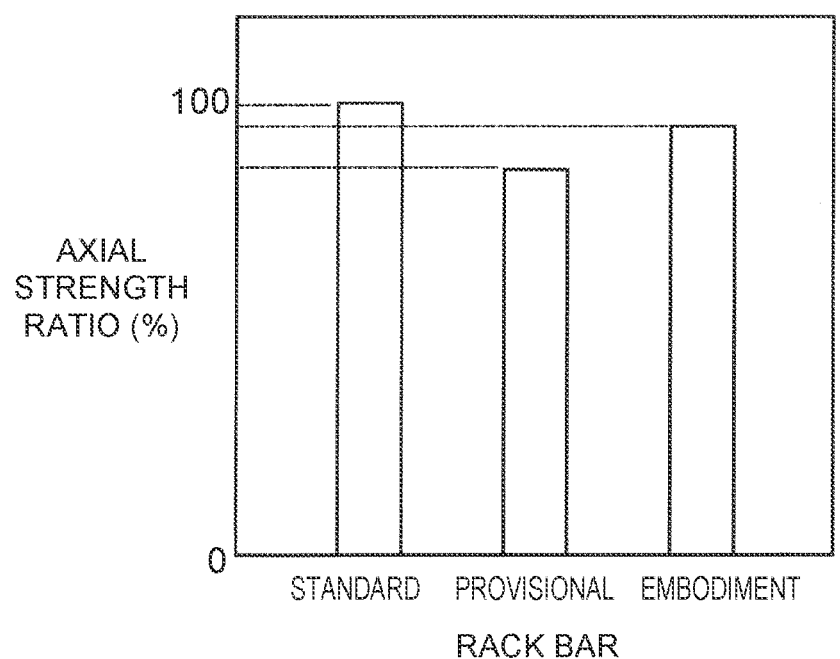
FIG. 3 shows axial strength ratio between the different rack bars.

FIG. 3 is a graph comparing axial strength ratio of the conventional standard rack bar 21, the provisional rack bar 31, and the rack bar 11 of the present embodiment. Assuming that axial strength of the conventional standard rack bar 21 is 100%, both of the provisional rack bar 31 and the rack bar 11 of the present embodiment has axial strength within about −15%. That is, the axial strength of the rack tooth 111 of the rack bar 11 of the present embodiment can be set within an allowable axial strength range of the standard rack tooth 211 of the standard rack bar 21. This ensures required strength (axial strength in particular) of the rack tooth 111 of the rack bar 11 with the smaller rack diameter.

Figure 4:
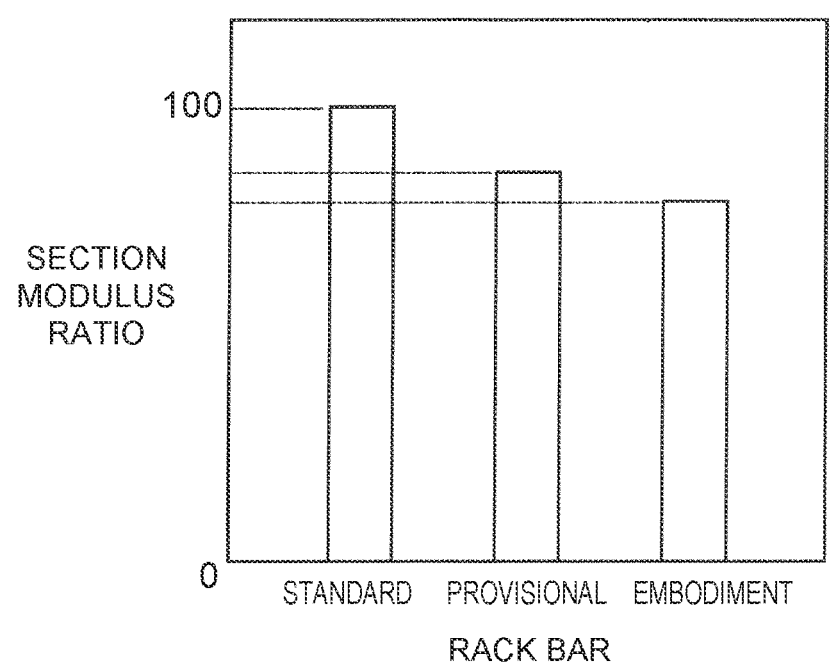
FIG. 4 shows section modulus ratio between the different rack bars.

Also, reducing the rack diameter of the rack bar typically makes it difficult to ensure required strength (bending strength in particular) of the rack bar as described in the above Summary section. FIG. 4 is a graph comparing section modulus of the conventional standard rack bar 21, the provisional rack bar 31, and the rack bar 11 of the present embodiment. Assuming that section modulus of the conventional standard rack bar 21 is 100%, both of the provisional rack bar 31 and the rack bar 11 of the present embodiment has section modulus of within about −30%.

Figure 5:
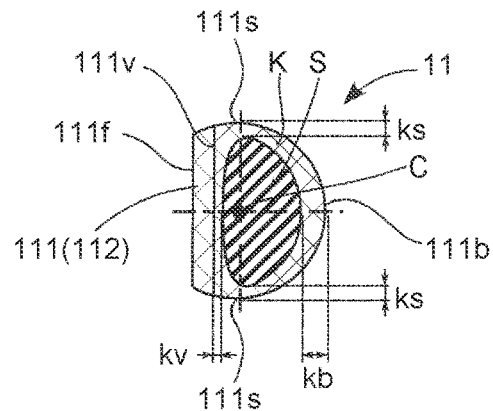
FIG. 5 is a sectional view showing thickness distribution of a hardened layer of the rack bar of the embodiment of the disclosure as viewed in the axial direction of the rack bar.

To form a hardened layer continuously over the entire circumference of the rack bar is an effective measure. As shown in FIG. 5, the rack bar 11 of the present embodiment includes a hardened layer K (indicated by the cross hatching in the figure) continuously formed over the entire circumference of each rack tooth 111 (the rack tooth row 112) and mainly composed of a martensite structure, and a center portion S (indicated by the single hatching in the figure) formed inside the hardened layer K and having toughness and lower hardness than the hardened layer K. This is because the hardened layer K present from a tooth tip 111f to the bottom land 111v of each rack tooth 111 can help reduce tooth flank wear and toothing breakage (or increase fatigue strength and break strength) at areas where the rack teeth 111 mesh with the pinion teeth 9a.

Also, the hardened layer K on the bottom land 111v side of each rack tooth 111 helps restrain breakage from occurring at the bottom land 111v due to bending of the rack bar 11. The hardened layer K is also present on the back 111b of the rack bar 11 relative to the bottom land 111v of the rack tooth 111; the back 111b is a portion that is, following the bottom land 111v, second most prone to breakage due to bending. The hardened layer K on the side 111s of the rack bar 11 relative to the bottom land 111v of the rack tooth 111 is necessary for providing reinforcement against bending.

Figure 6A:
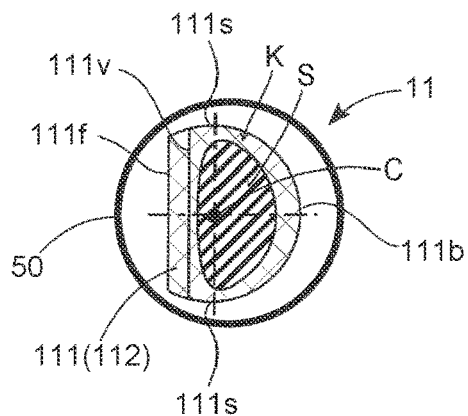
FIG. 6A shows a method for forming the hardened layer of the rack bar of the embodiment of the disclosure and the state of the hardened layer as viewed in the axial direction of the rack bar.
Figure 6B:
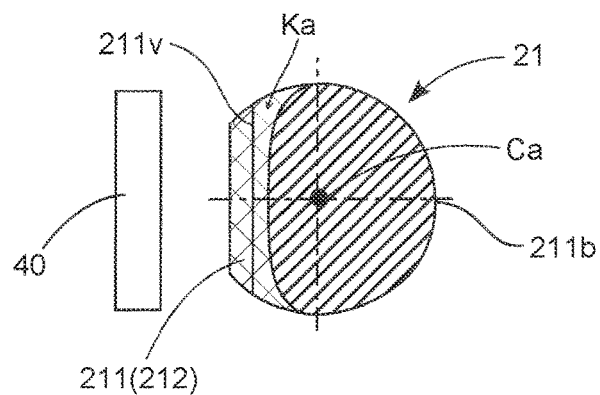
FIG. 6B shows a method for forming a hardened layer of the conventional standard rack bar and the state of the hardened layer as viewed in the axial direction of the standard rack bar.

As shown in FIG. 6B, a hardened layer Ka (indicated by the cross hatching in the figure) of the conventional standard rack bar 21 is formed by conduction (resistance heating) using a heating element 40. Per one heating, the hardened layer Ka is formed only on the rack tooth 211 (rack tooth row 212) side. Accordingly, heating the entire circumference of the rack tooth 211 (rack tooth row 212) of the standard rack bar 21 by conduction (resistance heating) requires at least two times of heating, one of which is for the rack tooth 211 (rack tooth row 212) side and the other of which is for the back 211b relative to the rack tooth 211 (rack tooth row 212) side.

In view of this, as shown in FIG. 6A, the hardened layer K (indicated by the cross hatching in the figure) is formed by quenching and tempering by induction (high frequency induction heating) at appropriate temperature using a heating coil 50. Heating the entire circumference of the rack tooth 111 (rack tooth row 112) of the rack bar 11 by induction (induction heating) only requires one time of heating, which helps avoid cost increase.

As described above, forming the hardened layer K continuously over the entire circumference of the rack tooth 111 (rack tooth row 112) ensures required strength (in particular, bending strength) of the rack bar 11. However, the inventors have found that forming the hardened layer K deeply in the rack bar 11 is likely to embrittle the rack bar 11. This is because forming such a deep hardened layer K (mainly composed of a martensite structure) in the rack bar 11 decreases the center portion S, which is formed inside the hardened layer K and has toughness and lower hardness than the hardened layer K.

In view of this, as shown in FIG. 5, the hardened layer K (indicated by the cross hatching in the figure) is varied in thickness according to circumferential positions on the rack bar 11. This helps avoid decrease of the center portion S and avoid embrittlement of the rack bar 11. Specifically, when the rack bar 11 of the present embodiment is viewed in the direction of the axis C, the depth of the hardened layer K (indicated by the cross hatching in the figure) from the bottom land 111v of the rack tooth 111 is the smallest, followed by the depth from the side 111s of the rack bar 11 relative to the bottom land 111v and then the depth from the back 111b of the rack bar 11 relative to the bottom land 111v.

The depths kv, kb of the hardened layer K from the bottom land 111v of the rack tooth 111 and from the back 111b of the rack bar 11, respectively, are measured on a straight line perpendicular to the bottom land 111v of the rack tooth 111 and passing through the axis C of the rack bar 11. The depth ks of the hardened layer K from the side 111s of the rack bar is measured on a straight line perpendicular to the above straight line and passing through the axis C of the rack bar 11.

The reason for varying the depth of the hardened layer K according to circumferential positions on the rack bar 11 is given below. Since the bottom land 111v of the rack tooth 111 is prone to breakage therefrom due to bending of the rack bar 11, the hardened layer K at the bottom land 111v is preferably deep, but there is a concern about forming the deep hardened layer K as described below. Specifically, the hardened layer K of the rack bar 11 is formed using the heating coil 50. Thus, placing the heating coil 50 offset toward the rack tooth 111 allows to form the deep hardened layer K at the bottom land 111v of the rack tooth 111.

However, if the tooth tip 111f of the rack tooth 111 is too close to the heating coil 50, the tooth tip 111f may melt or the rack tooth 111 may distort. To avoid this, an appropriate clearance is required between the heating coil 50 and the tooth tip 111f of the rack tooth 111. This means that there is a limitation on the maximum depth kv of the hardened layer K from the bottom land 111v of the rack tooth 111, which may result in insufficient bending strength of the rack bar 11.

In view of this, the depth kb of the hardened layer K from the back 111b of the rack bar 11, which is second most prone to breakage due to bending next to the bottom land 111v of the rack tooth 111, is made largest, whereby bending strength of the rack bar 11 can be increased. The depth ks of the hardened layer K from the side 111s of the rack bar 11, which provides reinforcement against bending, is made second largest next to the depth kb from the back 111b, and this also increases bending strength of the rack bar 11.

The depths kb, ks of the hardened layer K from the back 111b and the side 111s, respectively, are determined taking into account the necessity to reduce a decrease in the center portion S. Specifically, to strike the balance between the bending strength of the rack bar 11 and a radial cross-sectional area of the center portion S of the rack bar 11, the hardened layer K is formed such that the depth kv from the bottom land 111v of the rack tooth 111, the depth ks from the side 111s of the rack bar 11, and the depth kb from the back 111b of the rack bar 11 increase in this order (kv<ks<kb).

Below a description will be given of a method for manufacturing the rack bar 11. The steel solid shaft member 11R is set on a cutting apparatus to undergo a cutting process whereby the female thread 113 for coupling with the tie rod 12 is cut on each end face of the shaft member 11R (step S1 in FIG. 7). Then, the shaft member 11R having undergone the cutting process is set on a pressing apparatus to undergo a press process whereby the rack tooth row 112 is formed on the outer surface of the shaft member 11R (step S2 of FIG. 7).

The shaft member 11R having undergone the press process is set in a high frequency induction heating furnace and heated. Then, the heated shaft member 11R is quenched by rapid cooling (step S3 in FIG. 7). The quenched shaft member 11R is set in the high frequency induction heating furnace and heated for a predetermined period for tempering (step S4 in FIG. 7). The thus-formed hardened layer K has the smallest depth from the bottom land v of the rack tooth 111, followed by its depth from the side 111s of the rack bar 11 and then its depth from the back 111b of the rack bar 11.

Figure 7:
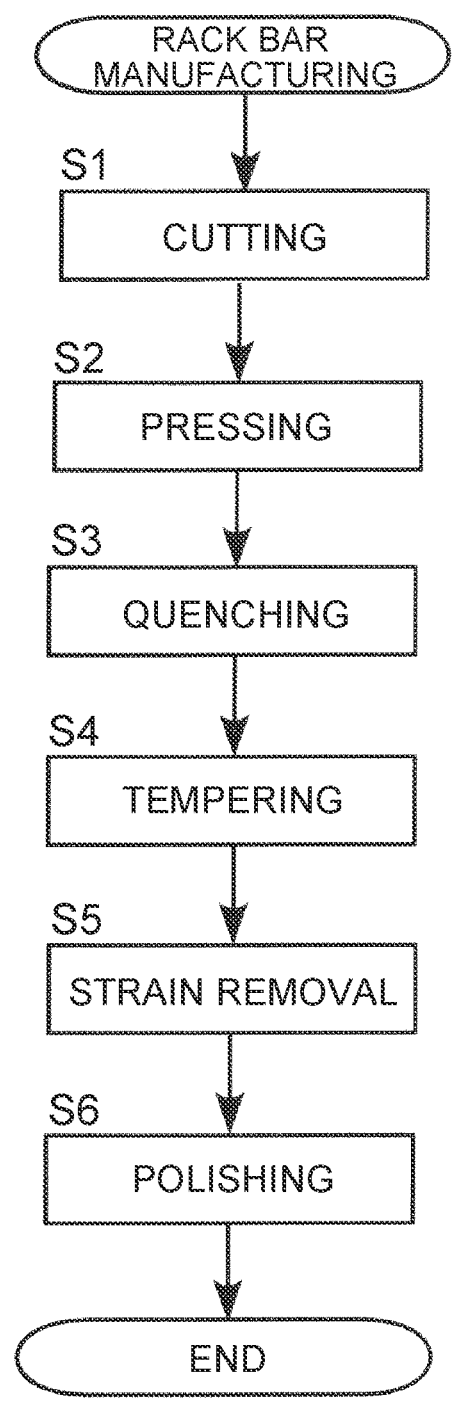
FIG. 7 is a flowchart of a method for manufacturing the rack bar of the embodiment of the disclosure.

The quenched and tempered shaft member 11R is set in the press apparatus, where the shaft member 11R is pressed to have its residual strain removed (step S5 in FIG. 7). The shaft member 11R with its residual strain removed is set in a polishing machine to undergo a polishing process, whereby the rack tooth row 112 and other portions are polished (step S6 in FIG. 7). Completion of the above steps completes the rack bar 11.

What is claimed is:

1. A rack bar comprising:
   a rack tooth row including a plurality of rack teeth meshing with pinion teeth;
   a hardened layer provided continuously over an entire circumference of the rack tooth row; and
   a center portion provided inside the hardened layer and having a lower hardness than the hardened layer, wherein:
   when a cross-section of the rack bar is viewed, the cross-section being defined by a plane that (i) extends through an axial center of the rack bar and (ii) is parallel to a line perpendicular to a bottom land of the rack teeth, a depth of the hardened layer at positions i), ii), and iii) increases in this order:
   i) the bottom land of the rack teeth;
   ii) a side of the rack bar relative to the bottom land;
   iii) a back of the rack bar relative to the bottom land, and the depth of the hardened layer at the back of the rack bar has a predetermined maximum depth configured to provide a clearance between the rack tooth row and a heating coil; and
   the hardened layer is provided by induction heating of the entire circumference of the rack tooth row, wherein:
   the line perpendicular to the bottom land of the rack teeth is offset from a line perpendicular a longitudinal axis of the rack bar.

2. A steering apparatus comprising:
   a housing;
   a rack bar supported by the housing so as to move in an axial direction and coupled to wheels of a vehicle; the rack bar including: a rack tooth row including a plurality of rack teeth meshing with pinion teeth; a hardened layer provided continuously over an entire circumference of the rack tooth row; and a center portion provided inside the hardened layer and having a lower hardness than the hardened layer; and
   a pinion shaft supported by the housing so as to rotate around an axis of the pinion shaft, the pinion shaft meshing with the rack tooth row of the rack bar, the pinion shaft being coupled to a steering wheel of the vehicle, wherein:
   when a cross-section of the rack bar is viewed, the cross-section being defined by a plane that (i) extends through an axial center of the rack bar and (ii) is parallel to a line perpendicular to a bottom land of the rack teeth, a depth of the hardened layer at positions i), ii), and iii) increases in this order:
   i) the bottom land of the rack teeth;
   ii) a side of the rack bar relative to the bottom land;
   iii) a back of the rack bar relative to the bottom land, and the depth of the hardened layer at the back of the rack bar has a predetermined maximum depth configured to provide a clearance between the rack tooth row and a heating coil; and
   the hardened layer is provided by induction heating of the entire circumference of the rack tooth row, wherein:
   the line perpendicular to the bottom land of the rack teeth is offset from a line perpendicular a longitudinal axis of the rack bar.

* * * * *